July 7, 1953          E. F. JIRSA          2,644,538

OPERATOR'S STATION STRUCTURE FOR TRACTORS

Filed Aug. 13, 1948          3 Sheets-Sheet 1

INVENTOR.
E.F. JIRSA
ATTORNEYS

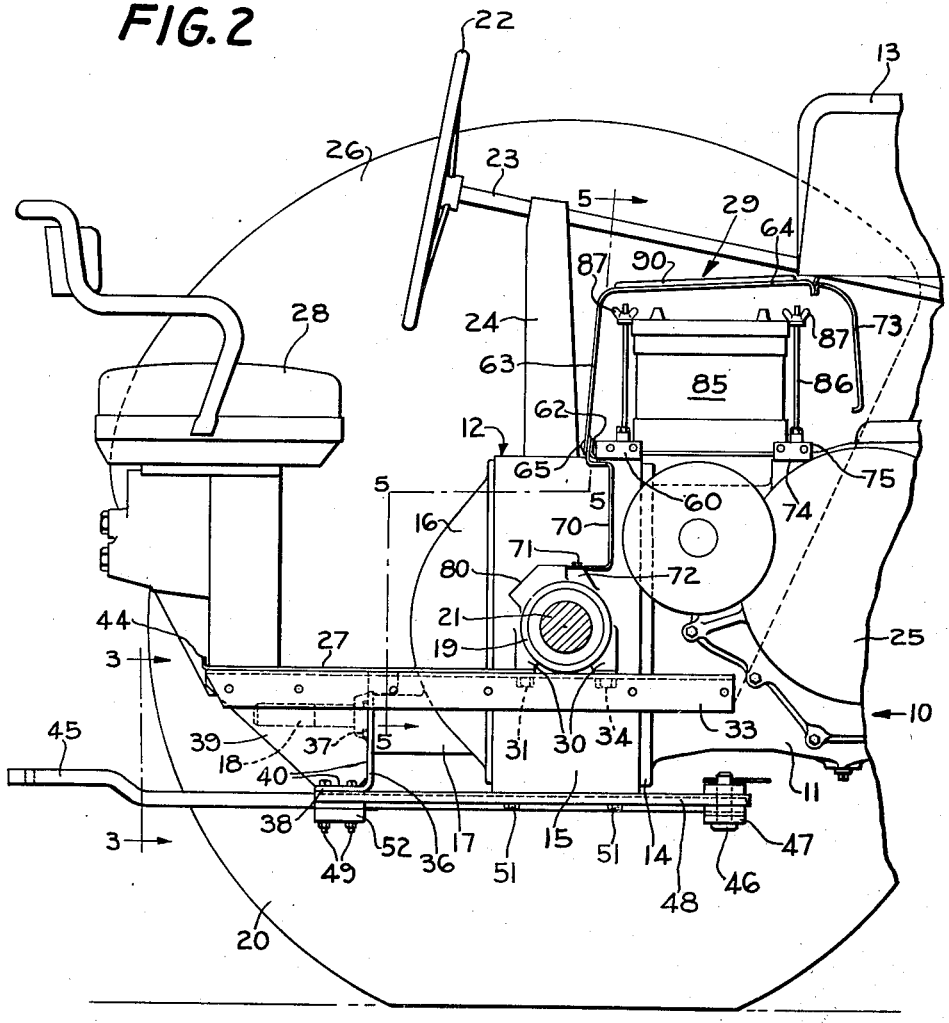

July 7, 1953 — E. F. JIRSA — 2,644,538
OPERATOR'S STATION STRUCTURE FOR TRACTORS
Filed Aug. 13, 1948 — 3 Sheets-Sheet 3
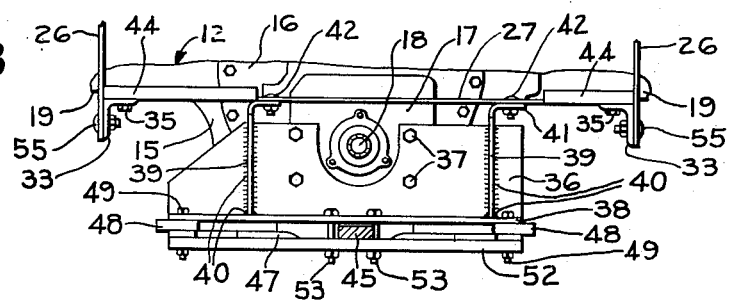
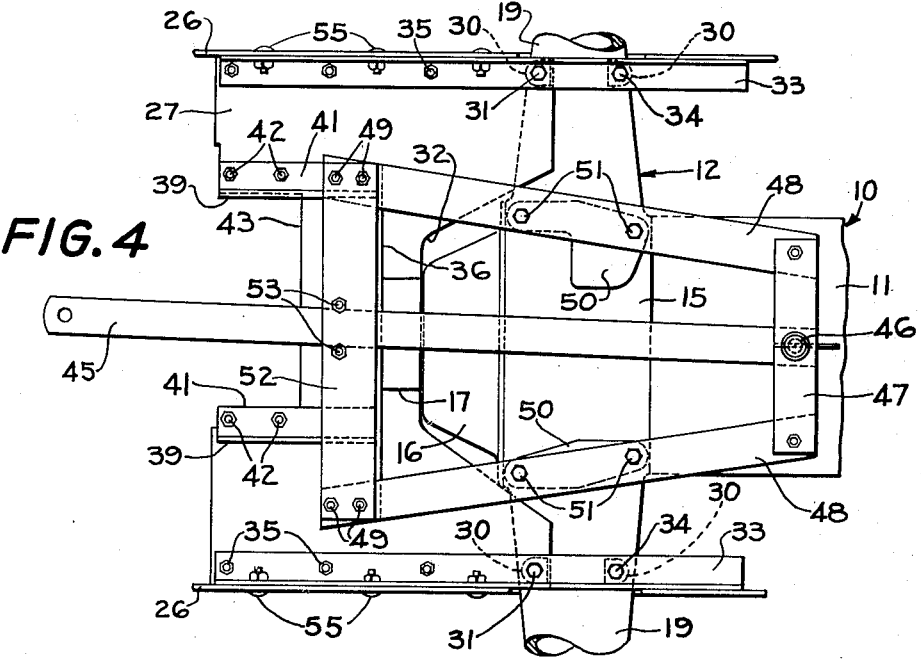
INVENTOR.
E. F. JIRSA
ATTORNEYS Patented July 7, 1953

2,644,538

UNITED STATES PATENT OFFICE 2,644,538

OPERATOR'S STATION STRUCTURE FOR TRACTORS

Emil F. Jirsa, Waterloo, Iowa, assignor to Deere Manufacturing Co., Dubuque, Iowa, a corporation of Iowa Application August 13, 1948, Serial No. 44,162

8 Claims. (Cl. 180—1)

This invention relates to a tractor and more particularly to an operator's station structure therefor.

The conventional tractor comprises a longitudinal relatively narrow body supported at its front end on front wheels and at its rear end on a transverse axle structure including relatively widely spaced traction wheels; an operator's seat is carried on the body between the traction wheels and includes a seat ahead of which are the tractor steering wheel and other controls for the tractor. It has heretofore been known to provide the rear portion of the tractor with fender and platform structure to protect the operator from the traction wheels and to provide for the operator a convenient standing area on which he may stand to operate the tractor. The platform further serves as means by which the operator may mount or dismount from the tractor. In such known constructions, the fenders have not always been adequately supported because of the peculiar relationship between the axle housing and the relatively narrow body; that is to say, it has heretofore been difficult to appropriately tie the fenders together without resort to relatively expensive structural members between the fenders and the body, inasmuch as it is desirable to locate the fenders as widely apart as possible to give the operator the greatest amount of room on the platform. Further, the traction wheels are usually of substantial diameter and this requires that the fenders be correspondingly large, with the result that the upper portions of the fenders are relatively remote from other portions of the tractor on which they could be supported.

According to the present invention, the operator's station structure includes a platform, fenders or side sheets, and supporting means for upper forward portions of the fenders including an enclosure or compartment structure ahead of the operator's seat and rearwardly of the forwardly located engine and hood structure, it being a feature of the invention in this respect to utilize the enclosure structure for the purpose of tying the fenders together and to the body and for the further purpose of housing or carrying tractor auxiliaries such as storage batteries. A further object of the invention is to utilize the enclosure structure as means for delineating the forward portion of the operator's station. Another object of the invention relates to the provision of an enclosure and structural element in the form of a plurality of related wall portions, one of which forms a generally upright cowl extending across the operator's station between the fenders and a forwardly extending top joined at its rear edge to the upper edge of the cowl and extending forwardly toward the engine and hood structure. A still further feature of the invention resides in the provision of supporting means within the enclosure element for carrying storage batteries or the like for the tractor, in connection with which it is a subsidiary feature of the invention to provide the top portion of the enclosure structure with openings through which access may be had to the storage batteries or the like, these openings being normally closed by removable covers.

Inasmuch as the lateral distance between the fenders substantially exceeds the width of the engine and hood structure, the transversely elongated enclosure or compartment structure will overhang at each side of the engine and hood structure. It is a further feature of the invention to locate the storage batteries or other auxiliaries in the overhanging portions of the enclosure or compartment structure, leaving the central portion of the structure available for other purposes. Other objects of the invention are: To provide appropriate enclosure means or shields between the fenders or side sheets and the body, particularly at the points where the fenders are spaced laterally outwardly from the body and also at points where the enclosure structure is spaced vertically above the laterally outwardly extending axle housing; to provide improved supporting means for the platform, preferably comprising longitudinally extending supports secured to the axle housing and tied together with a transverse support that is secured to a rearwardly extending power take-off shaft housing.

The foregoing and other important objects and desirable features inherent in and encompassed by the invention will become apparent as the disclosure of a preferred form of the invention is made in the following detailed description and accompanying sheets of drawings in which:

Figure 2 is a side elevational view of the structure shown in Figure 1, the near wheel and the near fender having been removed;

Figure 3 is a fragmentary rear elevational view, partly in section, as viewed along the line 3—3 of Figure 2;

Figure 4 is a fragmentary bottom plan view of the intermediate portion of the platform and drawbar structure;

Figure 5 is a transverse sectional view taken substantially on the line 5—5—5—5 of Figure 2;

Figure 6 is a fragmentary sectional view taken substantially on the line 6—6 of Figure 1;

Figure 7 is a fragmentary sectional view taken substantially on the line 7—7 of Figure 1; and Figure 8 is a fragmentary sectional view taken substantially on the line 8—8 of Figure 1.

Figure 1:
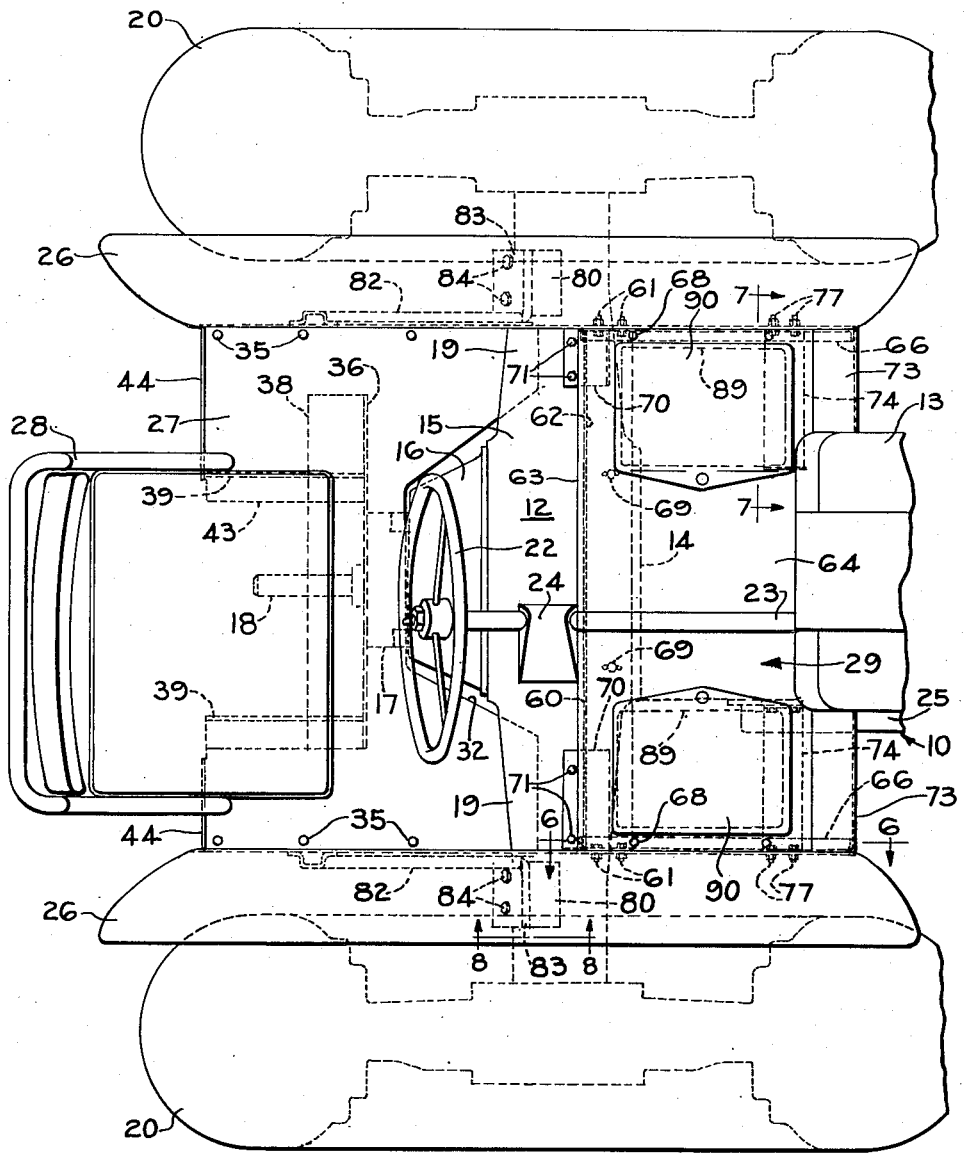
Figure 1 is a plan view of the rear portion of a tractor embodying an operator's station structure constructed according to the invention.

Although the drawings illustrate and the following specification will describe the invention in connection with a tractor of the type having rear traction wheels and a forwardly extending body including an engine and hood structure, it is to be understood that the various principles of the invention can be used in other vehicles. Accordingly, the present disclosure should be taken as illustrative and not limiting.

The basic structure of the tractor illustrated is typical of many tractors and accordingly will be described only generally, a working knowledge of conventional details being assumed. The tractor is illustrated as having a relatively narrow longitudinally extending body 10 including a main frame or case 11 and a rear axle structure, designated generally by the numeral 12. The tractor shown here is of the type illustrated in the U. S. patent to McCray 1,919,069 in which the main case comprises the rearward or crank case part of an internal combustion engine of the kind in which the cylinders are horizontal and extend forwardly. The numeral 13 designates the rear part of an engine hood structure which overlies the rear part of the main case and which may include a fuel tank (not shown in detail), as is conventional in many types of tractors.

The rear part of the main case 11 is provided with a transverse flange 14 which is secured to the forward face of an intermediate enlarged portion 15 of the rear axle structure 12. The rear end of the enlarged portion 15 is closed by a cover housing 16 in the lower part of which is formed a rearwardly extending housing 17 within which is journaled a rearwardly projecting power take-off shaft 18. The power take-off shaft, the enlarged intermediate portion 15 of the axle structure, and the main case 11 and engine hood 13 are substantially in longitudinal alinement. In the case of the particular tractor illustrated, there is slight lateral offsetting of the various center lines and in other tractors the offsetting will be more pronounced; however, this is largely a matter of design and does not materially affect the present invention.

The rear axle structure 12 includes a pair of axle housings 19 which extend laterally at opposite sides of the intermediate axle housing portion 15 so that the outer end portions thereof are relatively widely spaced apart laterally as respects the relatively narrow width of the main case 11. The rear portion of the tractor is carried on ground-engaging supports such as rolling traction elements here shown as traction wheels 20, each axle housing 19 journaling therein an axle 21 (only one of which is shown in Figure 2) for connection in any appropriate manner to the proximate traction wheel.

The tractor may be supported in any suitable manner on front wheels (not shown) which are steered by a steering wheel 22 located substantially centrally of and above the rear axle structure 12 and carried at the rear end of a forwardly extending steering column 23, the rear portion of the latter being appropriately supported at 24 from an upper portion of the rear axle structure 12. In Figure 2, there is shown at 25 a housing or cover structure which is secured to the right hand side wall of the main case 11. This housing structure is not important to the present invention and may be considered for all practical purposes as an integral part of the main case. The upper portion of the main case 11 is, as best shown in Figure 2, substantially at the general level of the uppermost portion of the intermediate axle housing part 15. The general level of the axle housings 19 is considerably below that of the level of the top of the main case, and the general level of the upper portion of the engine hood structure 13 is considerably above the general level of the main case.

According to the present invention, the rear portion of the tractor is provided with an improved operator's station area which includes generally a pair of side sheets or fenders 26, a generally level platform 27, an operator's seat 28 behind the steering wheel 22, and an enclosure or compartment structure 29 located ahead of the steering wheel 22 and behind the rear part of the engine hood 13. As best seen in Figure 1, these components are efficiently grouped to delineate an operator's station in which the operator may be comfortably seated and in which he has ample room to stand and to mount and dismount from the tractor.

The supporting of the platform 27 is accomplished primarily by means utilizing the rear axle housings 19. To this end, each housing 19 is provided with a pair of lower mounting pads or surfaces 30 to the rear ones of which the forward portion of the platform is secured as by cap screws 31. The forward portion of the platform is cut out at 32 to accommodate the cover housing 16 for the intermediate portion 15 of the rear axle structure 12. The platform 27 extends rearwardly of the axle housings 19 and overlies the power take-off shaft housing 17. The platform is supported along each of its laterally outermost edges by a longitudinally extending support preferably in the form of an angle bar 33 which is secured by the cap screw 31 and a second cap screw 34 to the mounting pads 30 under the proximate axle housing 19. These angle bars 33 are substantially coextensive with the platform 27 in rearward extent and each is preferably secured to the platform by a plurality of nut and bolt assemblies 35. The intermediate portion of the platform is additionally supported by means secured to the power take-off shaft housing 17. This means preferably comprises a transverse plate 36 secured to the rear face of the power take-off shaft housing 17 by a plurality of cap screws 37 and having a lower integral flange 38, the purpose of which will appear below. The member 36—38 is substantially shorter than the width of the platform 27 and has secured thereto a pair of laterally spaced, rearwardly extending, generally triangular plates 39, each of which is secured, as by welding at 40, to the member 36—38 and each of which has a flanged upper end 41 which is secured by bolting at 42 to the intermediate portion of the platform 27. The intermediate portion of the platform is cut out at 43 above the power take-off shaft 18.

From the description thus far, it will be seen that the platform 27 is rigidly supported by the axle housings 19 and additionally by the power take-off shaft housing 17. The points of support are longitudinally spaced apart and thus adequately carry the platform against twisting strains imposed by vertical loading. As best shown in Figure 1, the platform 27 extends rearwardly at opposite sides of the seat 28 and each of these portions of the platform is turned up, as at 44, for reenforcement of the platform between the proximate supports 33 and 39.

The transverse member 36—38 not only serves as part of the supporting means for the platform 27 but serves also as part of a supporting means for drawbar structure for the tractor. The particular details of the drawbar illustrated here form the subject matter of assignee's United States Patent 2,528,784. However, the same will be briefly described here for the purpose of illustrating its relationship to the platform structure. The drawbar itself comprises a longitudinally extending drawbar member 45 which extends beneath the member 36—38 and beneath the intermediate portion 15 of the rear axle structure 12, projecting ahead of the latter to be pivotally carried at 46 by a short transverse member 47 which is in turn rigidly secured at its opposite ends to the forward ends of a pair of longitudinally extending supporting bars 48. The rear ends of these bars are carried respectively at outer end portions of the transverse member 36—38, as by bolts 49, and these bars are carried intermediate their ends by mounting pads 50 provided at the bottom of the intermediate part 15 of the rear axle structure 12. The bars 48 are preferably secured to the mounting pads by a plurality of cap screws 51. The connection of the rear ends of the bars 48 to the transverse member 36—38 includes also a transverse support 52 which lies below and parallels the flange 38 on the member 36—38 (Figures 3 and 4). The parts 38 and 52 thus provide a transverse guide for swinging of the drawbar 45 about its pivot pin 46. Normally, a pair of securing bolts 53 holds the drawbar 45 against lateral swinging.

Each of the angle bars 33 previously described as supporting the platform 27 has its vertical flange projecting downwardly for the purpose of supporting a proximate fender 26. Each member 33 extends both forwardly and rearwardly of the transverse center line of the axle structure 12 and the lower portion of each fender is substantially coextensive with and rigidly secured to the proximate member 33, the securing means preferably including a plurality of bolt and nut assemblies 55. The general shape of each fender is best shown in Figure 2, wherein it will be noted that the rear portion of each fender extends alongside the operator's seat 28 and a forward portion of each fender extends alongside the rear portion of the engine hood 13. It will be further noted, particularly from Figure 1, that the forward portions of the fenders are respectively spaced substantial distances laterally outwardly from the sides of the engine hood 13, all of which is consistent with the idea of giving the operator as much area as possible at his control station.

The enclosure or compartment structure 29 is, as previously stated, located just behind the rear part of the engine hood 13 and extends transversely across the tractor body between the right and left hand fenders 26. This structure includes a first transverse supporting means in the form of an elongated member 60 which is flanged at opposite ends and secured respectively to the fenders 26, as by bolting at 61. The member 60 includes along its rear edge a long upturned flange 62, which provides means for the attachment of a tunnel-like element having a pair of angularly related walls 63 and 64. The wall 63 is substantially vertical or upright and extends transversely across between the fenders 26, and has its lower edge secured to the flange 62 on the member 60 as by means of a plurality of bolts 65. The walls 63 and 64 are preferably formed from a single piece of sheet steel and the wall 64 provides a top or cover element which, like the vertical wall 63, extends across between the fenders 26. The arrangement of the elements comprising the walls 63 and 64 unifies the forward end of the operator's station and the vertical wall 63 provides a cowl ahead of the steering support 24.

For the purpose of supporting opposite ends of the element 63—64, the fenders are provided respectively with mounting strips 66 (Figure 6), each strip being secured to its respective fender preferably by a series of spot welds, as indicated at 67. The element 63—64 is removably secured at opposite ends respectively to the strips 66, as by a plurality of bolts 68. It will thus be seen that the wall portions 63 and 64 serve to tie the forward and upper portions of the fenders 26 together. Inasmuch as the walls 63 and 64 are angularly related, the element 63—64 has greater strength than a single wall. In addition, the vertical wall or cowl 63 is secured at 65, as aforesaid, to the flange 62 on the transverse member 60 and the latter is in turn rigidly secured to the body by means of a plurality of cap screws 69 (Figures 1 and 5) which are threaded into appropriately tapped bores in the intermediate portion 15 of the axle structure 12. The transverse member 60 is itself a member of substantial structural strength and, being disposed at a level intermediate that of the top wall 64 and that of the platform 27, serves as an intermediate support or tie member for the fenders 26.

Inasmuch as the member 60 is at a level above the upper surfaces of the axle housings 19, and inasmuch as the member has a length greater than the width of the body main case 11, there would be spaces at each side of the intermediate axle housing portion 15. However, these spaces are closed by shield members 70 (Figures 2 and 5), each of which has a flanged upper portion secured to the flange 62 of the member 60 and each of which further has a lower flanged portion secured, as by cap screws 71, to an upper mounting surface 72 on the proximate axle housing 19.

The spaces between the forward portions of the fenders and opposite sides of the engine hood 13 are respectively closed by a pair of shields 73, each of which is secured to a vertical portion of the proximate strip 66 on the proximate fender 26, as is best shown in Figure 6. These shields thus provide forward wall portions for the enclosure structure 29, the intermediate portion of the front of the enclosure structure being left open because it is directly behind the engine hood 13 and engine auxiliary parts between the bottom of the hood 13 and the upper part of the main case 11.

The forward portions of the fenders 26 are further secured to the body 10 by means of a second transverse supporting means including a pair of relatively short transversely extending supporting members 74, one of which is shown in position in the sectional view in Figure 7. Each member 74 is flanged at its opposite ends, as at 75 and 76, respectively. The flanged end 75 is secured to the proximate fender 26 as by a pair of bolts 77 and the inner or other flanged end 76 is secured to the proximate side of the main case it as by cap screws 78. Each fender is additionally supported on the rear axle housing 19 proximate thereto, each supporting means including a mounting pad 80 preferably cast integral with the axle housing and provided with a pair of tapped bores 81. The fender is provided with a diagonally extending reenforcing member 82 preferably spot welded to the exterior face of the fender and having secured thereto a mounting bracket 83 (Figure 8). Each mounting bracket 83 is flanged and appropriately apertured to receive a pair of cap screws 84 which are in turn received by the tapped bores 81 in the axle housing mounting pad 80.

From the description thus far, it will be seen that the fenders are adequately supported in such manner that they will easily bear the weight of the operator in the event that he is thrown against them during operation of the tractor. Further, the fenders and the enclosure structure 29, together with the platform 27, delineate an operator's station that affords the operator ample room for operation of the tractor while he is either standing or sitting. In addition, the structure is such as to contribute to the pleasing appearance of the tractor.

A further utilitarian function of the enclosure structure 29 resides in the enclosing thereby of tractor auxiliaries, here shown as a pair of conventional storage batteries 85. Each battery is carried by the supporting means afforded by proximate portions of the supports 60 and 75. As best shown in Figures 1 and 5, the batteries 85 are respectively carried in those portions of the enclosure structure 29 that overhang the main case 11. The batteries are thus disposed at opposite sides of the center line of the tractor body and in such position allow for the accommodation between them of such other auxiliaries or controls as may be desired. Each battery may be conveniently and removably secured to the supports 60 and 74 by long bolts 86 and wing nuts 87.

Access to the batteries 85 through the top 64 of the enclosure structure 29 may be had through a pair of openings 89 formed in the top wall 64 and normally covered or closed by removable covers 90. The covers may be secured to the top wall 64 in any suitable manner, the details of which are not important here.

The several broad objects of the invention have been stated at the beginning of the foregoing specification and other and more specific objects have been made apparent in connection with the description of the several details of the invention. Other objects, not specifically mentioned herein, will undoubtedly occur to those versed in the art. It will be understood, of course, that the foregoing description and accompanying illustration are based upon a preferred form of the invention and it will be apparent that this preferred form of the invention is susceptible to numerous modifications and alterations without departing from the spirit and scope of the invention as defined in the appended claims.

What is claimed is:

1. For a tractor of the type having a body or frame including a longitudinal portion and a transverse rear axle structure extending respectively laterally at opposite sides of the longitudinal portion to provide outer end portions on said structure, and a rolling element at each outer end portion: an operator's station, comprising a pair of upright side sheets spaced apart laterally and extending longitudinally respectively at opposite outer end portions of the axle structure to provide fenders lying respectively along the inner sides of the rolling elements and spaced laterally outwardly from opposite sides of the longitudinal body portion; a platform extending across and between the fenders rearwardly of the rear axle structure; means securing the platform to the tractor body; means securing the fenders to the platform; first transverse supporting means including a supporting member disposed ahead of the rear axle structure and extending across and between the fenders above the longitudinal body portion and at a level spaced above the level of the platform thereby leaving spaces respectively at opposite sides of the body between the level of said member and the level of the platform; means rigidly securing said member at opposite ends respectively to the fenders; means securing said member intermediate its ends to the body; second transverse supporting means disposed ahead of the first supporting means and secured to the body, including a pair of supporting portions respectively bridging the spaces between the fenders and the sides of the longitudinal body portion; an enclosure extending over the first and second supporting means and transversely between the fenders; means securing said enclosure at its opposite ends respectively to the fenders; and means including a pair of laterally extending and aligned shields depending from the transverse supporting member toward the platform, each closing one of the aforesaid spaces resulting from spacing of said supporting member above the level of the platform.

2. For a tractor of the type having a body or frame including a longitudinal portion and a transverse rear axle structure extending respectively laterally at opposite sides of the longitudinal portion to provide outer end portions on said structure and a rolling element at each outer end portion: an operator's station, comprising a pair of upright side sheets spaced apart laterally and extending longitudinally respectively at opposite outer end portions of the axle structure to provide fenders lying respectively along the inner sides of the rolling elements and spaced laterally outwardly from opposite sides of the longitudinal body portion; a platform extending across and between the fenders rearwardly of the rear axle structure; means securing the platform to the tractor body; means securing the fenders to the platform; first transverse supporting means including a supporting member disposed ahead of the rear axle structure and extending across and between the fenders above the longitudinal body portion; means rigidly securing said member at opposite ends respectively to the fenders; means securing said member intermediate its ends to the body; second transverse supporting means disposed ahead of the first supporting means and secured to the body, including a pair of supporting portions respectively bridging the spaces between the fenders and the sides of the longitudinal body portion; an enclosure extending over the first and second supporting means and transversely between the fenders; and means securing said enclosure at its opposite ends respectively to the fenders.

3. For a tractor of the type having a body including a longitudinal engine hood structure terminating at its rear end ahead of a transverse rear axle structure that extends respectively laterally at opposite sides of the longitudinal structure to provide outer end portions sustained respectively on rolling elements at opposite sides of the tractor: an operator's station, comprising a pair of upright side sheets spaced apart laterally and extending longitudinally respectively at opposite outer end portions of the axle structure to provide fenders lying respectively along the inner sides of the rolling elements and spaced laterally outwardly from opposite sides of the longitudinal structure, each fender extending both ahead and to the rear of the axle structure; a pair of fender-supporting means, one located ahead of and the other behind the axle structure, each including a member secured to the tractor body and extending laterally in opposite directions respectively toward and secured to the fenders for tying said fenders together and to the tractor body; a pair of laterally spaced apart tractor-auxiliary-supporting elements on the member ahead of the axle; and combined fender-bracing and enclosure means for said elements extending transversely over said member ahead of the axle and behind and independently of the rear end of the longitudinal structure and having opposite end portions secured respectively to the fenders.

4. For a tractor of the type having a body including a longitudinal engine hood structure terminating at its rear end ahead of a transverse rear axle structure extending respectively laterally at opposite sides of the longitudinal structure to provide outer end portions sustained respectively on rolling elements at opposite sides of the tractor: an operator's station, comprising a pair of upright side sheets spaced apart laterally and extending longitudinally respectively at opposite outer end portions of the axle structure to provide fenders lying respectively along the inner sides of the rolling elements and spaced laterally outwardly from opposite sides of the longitudinal structure; fender-supporting means including a transverse member spaced longitudinally from the axle structure and behind and independently of the rear end of the longitudinal structure and having opposite end portions respectively proximate to the fenders; means securing the member to the tractor body; means securing said opposite end portions of the member respectively to the fenders; tractor-auxiliary-supporting elements carried by said member behind and apart from the rear end of the longitudinal structure; and an enclosure for said elements including a cover element spaced above the member and extending across the tractor body between and interbracing the fenders and having opposite end portions respectively secured to the fenders above the end portions of the member.

5. For a tractor of the type having a body including a longitudinal engine hood structure terminating at its rear end ahead of a transverse rear axle structure extending respectively laterally at opposite sides of the longitudinal structure to provide outer end portions sustained respectively on rolling elements at opposite sides of the tractor: an operator's station, comprising a pair of upright side sheets spaced apart laterally and extending longitudinally respectively at opposite outer end portions of the axle structure to provide fenders lying respectively along the inner sides of the rolling elements and spaced laterally outwardly from opposite sides of the longitudinal structure, each fender having an upper portion at a level above the level of the body portion; combined structural and enclosure means apart from the rear end of the longitudinal structure and including a transversely elongated tunnel-like element extending between the upper portions of the fenders and behind the rear end of the longitudinal structure and having a plurality of angularly related supporting portions rigidly secured together, at least one of which is a base portion and at least one of which is a cover portion; means rigidly securing one of said element portions to the tractor body; and means securing opposite ends of at least a pair of the element portions respectively to the upper portions of the fenders.

6. For a tractor including a longitudinal body carried on transverse axle means having a pair of laterally spaced rolling elements and having an engine hood structure terminating at its rear end portion ahead of the axle means: an operator's station comprising a pair of laterally spaced, upright side sheets providing fenders for the rolling elements and disposed respectively along opposite sides of the body and inwardly of the rolling elements and extending longitudinally forwardly to have forward portions transversely aligned at the rear end portion of the engine hood structure; and an enclosure structure including an upright cowl member above the body and extending transversely between and secured at opposite ends to the fenders rearwardly of the rear end portion of the engine hood structure and having its upper edge at the level of the forward portions of the fenders, a generally horizontal top member extending transversely between the fenders and joined at its rear edge to the top edge of the cowl member and extending forwardly from the latter to the rear end portion of the engine hood structure, means securing said top member at its opposite ends to the fenders, a transverse supporting means enclosed by said cowl and top member and secured to the body and to the fenders and disposed below the top member to provide a bottom in said enclosure structure, said top member having an opening for access to the interior of said enclosure structure, and a removable cover for said opening.

7. For a tractor having a longitudinal body carried on a pair of laterally spaced apart traction elements and including an operator's station between the traction elements and provided with a seat ahead of which is an operator's standing area, and further including a narrow engine hood having a rear part including opposite sides spaced laterally inwardly respectively from the traction elements and an upper portion disposed at a level above the level of the standing area: a pair of laterally spaced, upright fenders extending longitudinally of the body respectively along opposite sides of the operator's station and inwardly of the traction elements and having forward portions substantially at the level of and respectively alongside the rear part of the engine hood; and an enclosure structure connected to the fenders and extending transversely across the body from one fender to the other behind the rear part of the engine hood and including a top portion below the level of the upper portion of the hood, a rear portion providing a cowl depending toward the standing area, means providing a support enclosed by said top and cowl portions, a pair of front portions respectively closing at least portions of the spaces between the engine hood and fenders, one of the enclosure structure portions having an opening therein for access to the interior of the enclosure means, and removable cover means for said opening.

8. In a tractor having a narrow body including a narrow forward engine hood structure carried on a pair of widely spaced rolling elements: an operator's station on the body, comprising means providing a standing area over the body between the rolling elements and rearwardly of the engine hood structure and having such width as to project laterally beyond opposite sides of the engine hood structure; a pair of upright side sheets supported by the body and lying respectively longitudinally along opposite sides of the standing area inwardly of the rolling elements and spaced apart laterally according to the width of the standing area so as to be spaced laterally outwardly respectively from opposite sides of the engine hood structure; means providing an elongated compartment structure of a length equal to the spacing between the side sheets and positioned ahead of the standing area and immediately rearwardly of the engine hood structure, with its length crosswise of the body to extend between the side sheets and further having opposite end portions respectively laterally outwardly of opposite sides of the body and connected respectively to the side sheets; and a plurality of supports within the compartment structure for carrying storage batteries or the like, one such support being located in each end portion of said compartment structure.

EMIL F. JIRSA.

References Cited in the file of this patent

UNITED STATES PATENTS

| Number | Name | Date |
|---|---|---|
| D. 113,555 | Erickson | Feb. 28, 1939 |
| 1,234,561 | Pilkington | July 24, 1917 |
| 1,341,355 | Browne | May 25, 1920 |
| 1,488,136 | Simpson | Mar. 25, 1924 |
| 1,498,268 | Harris | June 17, 1924 |
| 1,517,323 | Trahan | Dec. 2, 1924 |
| 1,773,496 | Osman | Aug. 19, 1930 |
| 1,779,142 | Osman | Oct. 21, 1930 |
| 1,945,169 | Walker | Jan. 30, 1934 |
| 1,958,862 | Radford | May 15, 1934 |
| 2,099,790 | Baker et al. | Nov. 23, 1937 |
| 2,360,056 | Heitshu | Oct. 10, 1944 |
| 2,362,719 | Radtke | Nov. 14, 1944 |
| 2,363,052 | Eberhard | Nov. 21, 1944 |
| 2,442,889 | Deal | June 8, 1948 |